UNITED STATES PATENT OFFICE.

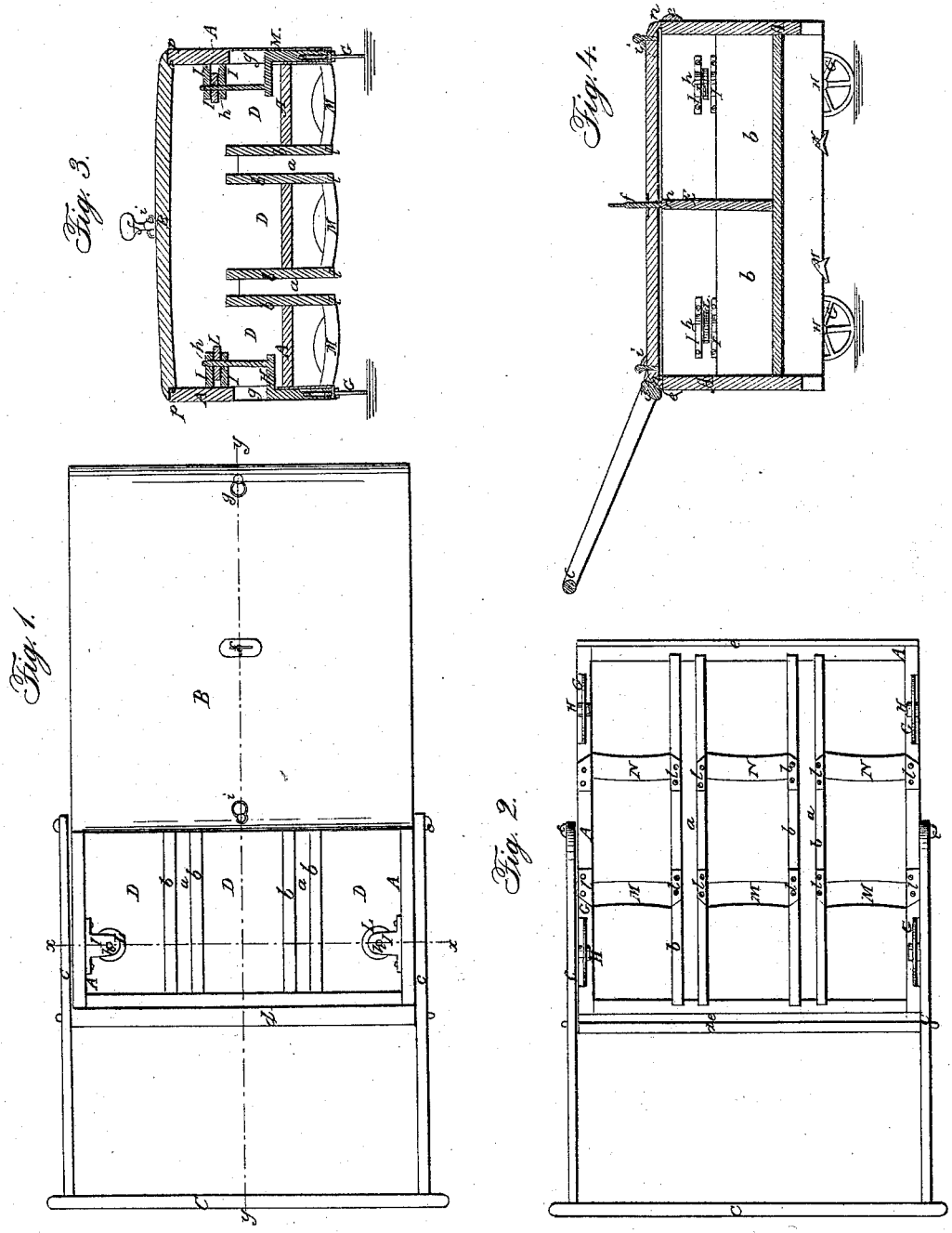

RICHARD F. JOYNES, OF BRISTOL, RHODE ISLAND.

IMPROVEMENT IN CULTIVATORS.

Specification forming part of Letters Patent No. 32,479, dated June 4, 1861

*To all whom it may concern:*

Be it known that I, RICHARD F. JOYNES, of Bristol, in the county of Bristol and State of Rhode Island, have invented a new and Improved Hand-Cultivator or Hoeing-Machine; and I do hereby declare that the following is a full and exact description thereof, reference being had to the accompanying drawings, making part of this specification—

Figure 1 being a plan of the machine; Fig. 2, a plan of the under side thereof; Fig. 3, a transverse vertical section in the plane indicated by the line $x\,x$, Fig. 1; Fig. 4, a longitudinal vertical section in the plane indicated by the line $y\,y$, Fig. 1.

Like letters designate corresponding parts in all the figures.

A frame, A, in the form of a rectangular close box, having a close but partially removable cover, B, receives and incloses all the working parts of the machine, so as to perfectly shield them from the weather. To this end the cover B is made a little convex, so as to shed water readily, and thus the machine may be left exposed in the garden or field without material injury. The cover B slides in side grooves, $p\,p$, Fig. 3, and it has projecting lips $n\,n$, Fig. 4, at its ends, which strike a projecting lip, $m$, on the upper edge of a middle partition, E, when slid out either way, and prevents the cover from being more than half removed in either direction, as shown in Fig. 1, while complete access is obtained into either end of the box. A central screw, $f$, serves to tighten the cover, when centrally over the box, by entering or screwing down upon the said middle partition, E. The cultivator is driven along by means of a handle, C, the side pieces of which are hinged at $c\,c$ to the sides of the box midway from end to end, so that the handle may be turned to either end for pushing the machine along either one way or the other. A cross-bar, $d$, pivoted to the side pieces of the handle, rests at either end on a ledge, $e$, secured to the box A, substantially as shown, and in this way the handle is supported in the proper position.

The machine is supported and conveyed on four wheels, G G G G, which are respectively mounted in concealed posts or legs H H H H. These posts slide vertically in grooves $g\,g\,g\,g$, formed in the sides of the machine, and are provided at the top with screws $h\,h\,h\,h$, extending inward into the interior of the box, substantially as represented, and projecting thence upward, each one through two bearing-plates, I I, which are firmly secured to the sides of the machine, one over the other, at a short distance apart, so as to receive between them a nut, L, for the screw $h$ of each post. The said nuts are provided with milled edges, and by turning them the posts are adjusted up and down, so as to raise the machine high on the wheels G G G G, for transporting from place to place, as shown in the drawings, or so as to lower the machine down to its work. By this means, also, the depth to which the machine cultivates in the soil is adjusted either at one or more or all of the corners.

This machine, although applicable to field-work, is intended more particularly for cultivating garden vegetables, which are sown in drills.

The box A has longitudinal openings $a\,a$ through its whole length up from the bottom to the required height, and of the necessary width to allow the machine to pass over the young plants without disturbing them. These openings are at equal distances from each other and from the outer sides of the machine, corresponding with the distance between the rows of plants.

The drawings represent a machine for cultivating between three rows of plants at once. Any other convenient number within proper limits may be cultivated at once with a machine made for the purpose.

On both sides of the openings $a\,a$ are vertical plates $b\,b$, which, together with the sides of the box A, serve for attaching the knives M M M N N N to, for cultivating the soil as closely as desired, since these plates may be very thin. The knives may be secured by simple ears or flanges and screws $l\,l$ to these plates. The knives may be of any desired form and have any required position.

In order to enable the machine to be moved and cultivate in either direction, two sets of knives are attached to the machine, one set, M M M, cutting in one direction and the other set, N N N, cutting in the other direction. They may be easily arranged, so that when moving backward they will not cultivate at all, or will produce a different effect from their action in their forward direction. Rake or harrow teeth may be applied behind or between the knives for pulverizing the soil. If the machine is not heavy enough, stones or other weights may be placed in the compartments D D inside of the box A, so as to produce any weight at any part desired.

The efficiency, economy, and great utility of the invention are apparent without further specification.

What I claim as my invention, and desire to secure by Letters Patent, is—

1. The construction and arrangement of the inclosing-box A and cover B, in the manner and for the purpose herein set forth.

2. The arrangement and combination of the wheels G G, posts H H, bearing-plates I I, and nuts L L, substantially in the manner and for the purpose herein specified.

3. The arrangement of the openings *a a*, side plates, *b b*, and knives M M M or N N N, substantially as and for the purpose described.

4. The arrangement of the double sets of knives M M M and N N N, in combination with the reversible handle C, so that the machine may cultivate in both directions, substantially as specified.

In witness whereof I hereunto set my hand this 25th day of February, 1861.

RICHARD F. JOYNES.

Witnesses:
  JOHN W. DEARTH,
  THOMAS HOLMES.